United States Patent [19]

Miura et al.

[11] Patent Number: 4,819,210
[45] Date of Patent: Apr. 4, 1989

[54] OPTICAL INFORMATION WRITING METHOD

[75] Inventors: Akira Miura, Toride; Nobuhiro Gemma, Yokohama; Koichi Mizushima, Kamakura; Makoto Azuma, Yokohama; Takano Iwakiri, Ichikawa, all of Japan

[73] Assignee: Kabushiki Kaisha Toshiba, Kawasaki, Japan

[21] Appl. No.: 205,542

[22] Filed: Jun. 6, 1988

Related U.S. Application Data

[63] Continuation of Ser. No. 943,716, Dec. 19, 1986, abandoned.

[30] Foreign Application Priority Data

Mar. 25, 1986 [JP] Japan ............................... 61-66276
Jun. 4, 1986 [JP] Japan ............................. 61-129689
Jun. 4, 1986 [JP] Japan ............................. 61-129692

[51] Int. Cl.$^4$ ..................... G11C 7/00; G11C 11/42
[52] U.S. Cl. ........................... 365/106; 365/118; 365/119; 369/275; 369/284; 369/100
[58] Field of Search ............... 365/106, 113, 118, 119; 369/100, 275, 283, 284

[56] References Cited

U.S. PATENT DOCUMENTS

| | | | |
|---|---|---|---|
| 3,801,966 | 4/1974 | Terao | 365/106 X |
| 3,932,025 | 1/1976 | Lakatos et al. | 365/106 X |
| 4,394,749 | 7/1983 | Tsukada et al. | 365/106 |
| 4,534,015 | 8/1985 | Wilson | 365/106 |
| 4,574,366 | 3/1986 | Potember | 369/100 X |
| 4,644,519 | 2/1987 | Markvoort et al. | 369/275 |
| 4,668,573 | 5/1987 | Terao | 346/76 L X |
| 4,682,321 | 7/1987 | Takaoka et al. | 369/275 X |

FOREIGN PATENT DOCUMENTS

0159397 10/1985 European Pat. Off. ............ 365/106
53-99735 8/1978 Japan .
58-209594 12/1983 Japan .

OTHER PUBLICATIONS

IBM-TDB-vol. 14, No. 11; Apr. 1972 Stretching the Duration of Thermal Pulses for Laser Beam Writing US-CL 365/113.
Proceedings of International Symposium On Future Electron Devices, p. 47 (1985), "J-aggregation of Photochromic Spiropyran in LB Films", E. Ando et al.
J. de Physique C3, vol. 44, p. 1597 (1983), R. S. Potember et al., "Erasable Optical Switching in Semiconductor Organic Charge-Transfer Complexes".

*Primary Examiner*—Stuart N. Hecker
*Assistant Examiner*—Alyssa H. Bowler
*Attorney, Agent, or Firm*—Oblon, Fisher, Spivak, McClelland & Maier

[57] ABSTRACT

An information writing method of an optical recording device selectively irradiates light on an optical recording medium, having a thin organic film containing donor and acceptor molecules, and a pair of electrodes for applying a voltage to the thin organic film, in order to cause charge transfer between the donor and acceptor molecules, and records a change in optical or electric characteristics of the thin organic film by the charge transfer as information. Selective light irradiation is performed while a voltage is applied to the electrodes.

31 Claims, 9 Drawing Sheets

(D1)　(D2)　(A)

(D1)　(D2)　(A)

F I G. 15
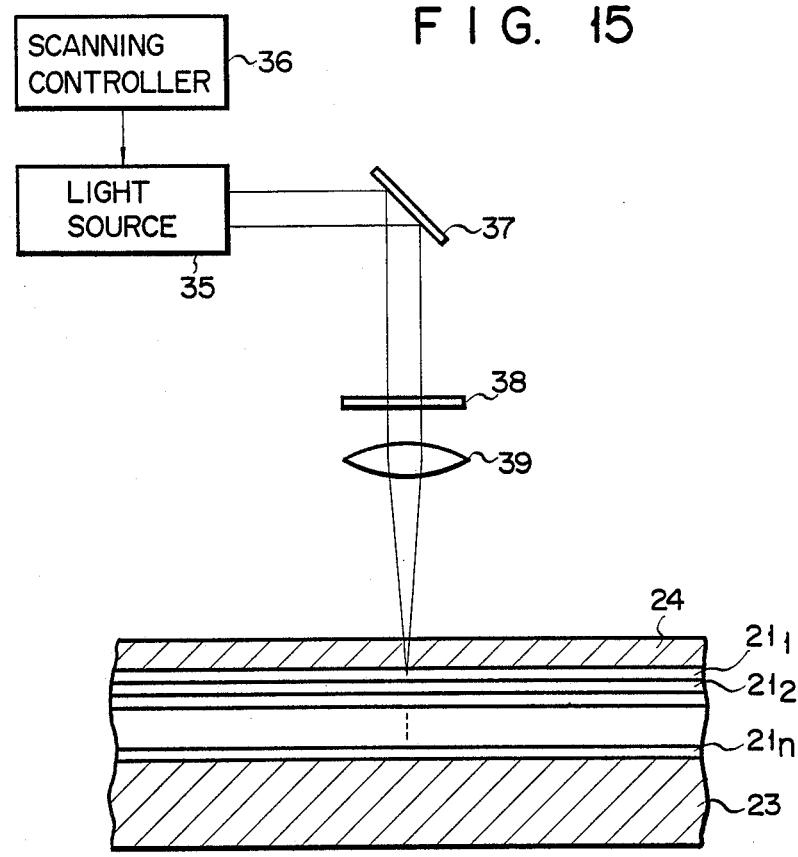
F I G. 16
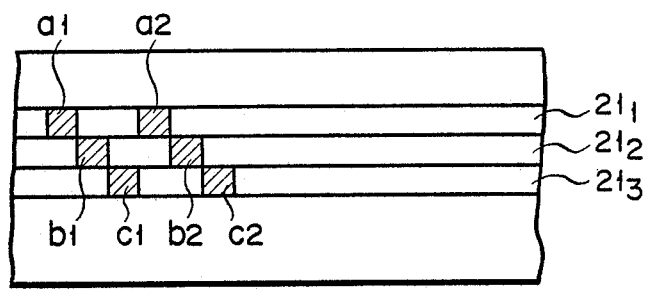

OPTICAL INFORMATION WRITING METHOD

This application is a continuation of application Ser. No. 943,716, filed on Dec. 19, 1986, now abandoned.

BACKGROUND OF THE INVENTION

1. Field of the Invention

The present invention relates to an optical recording device using an organic film and, more particularly, to an optical recording device which utilizes a charge transfer phenomena between donor molecules (electron donative molecules) and acceptor molecules (electron acceptive molecules) and an information writing method thereof.

2. Description of the Prior Art

Recently, computer technology has been developed to a remarkable extent, with widespread application thereof. Along with this trend, it becomes increasingly important to efficiently accumulate a large amount of information in a small storage space, and to process it at a high speed. To meet this demand, various types of information recording devices have been developed recently. Above all, information recording devices using an optical disk are attracting a great deal of attention because of their high performance, high bit density and low cost, and are being developed widely. For example, studies on various types of optical recording media using inorganic chalcogenides or organic coloring materials are increasing these days.

Meanwhile, apart from the recording system of this type, intensive studies are now being made on a data storage system with the bit density of $10^{10}$ bit/cm$^2$ or higher such as a photochemical hole-burning recording system, wherein multiple recording is performed by making use of the discrepancy of fine structure of excited vibronic states of an organic molecule for the purpose of higher density data storage.

The conventional recording system, however, has various drawbacks. First, most of the conventional optical recording systems use "heat-mode" recording media, whether organic or inorganic. For example, recording is performed by utilizing the fact that a recording medium melts or evaporates due to thermal energy caused by absorbed photons. Information is read by detecting a difference in optical reflection or absorption intensity at a recording site. With this system, an optical energy density must be very high to accomplish a recording. When a signal having a predetermined detection level is to be obtained by using an inorganic chalcogenide series recording medium, e.g., Te and its analogues, the energy density of a recording light must be at least 3 to 100 mJ/cm$^2$. As a result, a sufficiently high recording speed cannot be obtained at a finate power of light source such as semiconductor laser diode.

Another recording system, different from the heat mode system, is based on photon-mode recording such as a photochromic phenomenon utilizing a change cause by absorbed photons in the molecular structure of an organic molecule. In this system, since a molecular structure and conformation are significantly changed, the characteristics of the recording site such as isomerization and bond cleavage are unstable and tend to change over time. Still another new optical data storage system utilizes photochemical hole-burning. Since this system utilizes tautomerism of proton transfer in an organic molecule, such as porphyrin and phthalocyanine (in rigid matrices), both the conversion efficiency and speed are low and small, and its noise level cannot be decreased unless at low temperature less than 100° K. For these reasons, a high-density recording system of $10^6$ bits/cm$^2$ or higher is difficult to provide, despite great potential demand for it.

A critical defect of the conventional optical recording device is that, once information is written, it cannot be erased to allow new information to be rewritten. Optical magnetic disks as erasable recording media have been developed in order to eliminate this defect. Since this system reads a magnetizing direction due to a magnetic Kerr effect as a recorded signal, however, a high S/N ratio inevitably cannot be obtained, an expensive optical system to detect the signals with high resolution is required for reading, and an expensive rare earth elements must be used in order to obtain the efficient Kerr rotation. For these reasons, this system is limited only to a special application and thus lacks versatility.

Recent developments in understanding the structure, properties and synthesis of organic materials may realize a new functional element that uses such a well-characterized organic material. In particular, since a technique has advanced for ordering organic molecules in condensed phases and stacking their layers with the thickness of 10 Å or lower, which is represented by the Langmuir-Blodgett process (to be referred to as the LB process hereinafter), a monolayer of organic material can be easily formed and built-up as a controlled layer structure. This may allow development of a new functional element by making use of the optical and electrical properties of organic molecules in controlled state. In fact, Roberts et al., at Durhram University in the U.K., report a semiconductor device, such as a MIS type FET and a MIS type light-emitting element, which uses an organic thin film of the thickness below 100 Å, formed by the LB process, as an insulating film on semiconductors. Although an organic thin film obtained by the LB process is expected to serve as an optical recording medium because of its good optical response characteristics of organic molecules and the characterized film structures, it has not yet been put into practical use.

As described above, various types of optical recording devices and optical recording systems that are conventionally proposed do not sufficiently utilize the characteristic features of super high recording density as optical recording in improving their writing speed, contrast, stable storage performance of recording conditions, and so on.

SUMMARY OF THE INVENTION

It is an object of the present invention to provide an information writing method which enables high speed recording, has a high recording sensitivity, and good storage performance of recording conditions.

It is another object of the present invention to provide an optical recording device which has a high recording sensitivity and signal contrast, and good storage performance of recording conditions, and enables high-density recording.

It is still another object of the present invention to provide an optical recording device with higher S/N ratio, which does not require an expensive optical system for detecting recording signals, and enables both writing and erasing.

An optical recording medium used in the present invention is made of a thin organic film containing organic molecules, i.e., donor molecules which have a high ionization potential, and organic molecules, i.e., acceptor molecules, which have a large electron affinity. The principle of the information recording of the present invention utilizes a change in optical or electrical properties of a film at a recording site due to a charge transfer phenomenon between the donor and acceptor molecules within the thin organic film caused by absorbed photon.

According to the first embodiment of the present invention, there is provided an information-writing method of an optical recording device, wherein light selectively irradiates a surface of a recording medium consisted of a layered structure of donor and acceptor molecules while a voltage is applied through electrodes formed on two surfaces of the film, monolayered donor molecules are thus selectively and effectively excited to cause electron transfer to the adjacent monolayer of acceptor molecules, and a change in optical and/or electrical characteristics due to the charge transfer between both the molecules in the layered structure of the film caused thereby is recorded as information. In this case, since the voltage is applied to the thin organic film, electron-hole pairs formed by excitation of the excited donor molecules generated by the recording (excitation) light source are dissociated, and the electrons can thus effectively migrate to acceptor molecules which are located with controlled distance in the films.

With this method, charge transfer between monolayered donor and acceptor molecules contained in a thin organic film constituting a recording medium can be performed quite effectively and rapidly by irradiating light while applying the voltage. As a result, high speed writing is enabled and high recording sensitivity can be obtained. When the material and structure of the thin organic film constituting the recording medium are adequately selected, the recording state, i.e., the charge transfer state can be stably held. Information is recorded as a change in optical or electrical characteristics of the organic thin film. For example, when a change in absorbance and/or reflectance is optically read out as information, reading with a high S/N ratio can be performed.

The reason why effective information writing is performed in the first embodiment of the present invention, when selective optical excitation is performed while applying a voltage to the recording medium, will be described.

Encountered donor and acceptor molecules usually form a charge transfer complex and the energy of the complex formation is expressed as $\Delta E = I_p(D_O) - E_A(A_O)$, wherein $I_p(D_O)$ and $E_A(A_O)$ stand for ionization potential Ip of donor and electron affinity of acceptor. When the formation energy is balanced with Coulomb interaction force $\Delta C = \alpha \cdot <e>^2/\bar{r}$, CT complex is in an ionic state wherein their charges are dissociated. Note that $\alpha$ indicates a constant corresponding to the Madelung constant; $\bar{r}$, an average distance between both the molecules; and $<e>^2$, the effective charges of both charged molecules. As a result, when no external energy is supplied, the charge transfer rate is mostly determined by the distance between both the molecules. In this case, the stabilizing energy or absorption band shifted to longer wavelength due to the charge transfer formation is expressed as:

$$h\nu_{CT} = [I_p(D_O) - E_A(A_O)]\rho = -(\alpha \cdot <e>^2/\bar{r})\rho^2$$

where $\rho$ is the constant representing the charge transfer ratio.

When an external voltage ($\phi$) is applied to the stack layered structure of the donor and acceptor molecule in the films, the energy required for charge transfer can be decreased by $e\phi$. When donor molecules are selectively, optically excited by photon energy and a voltage is applied synchronously or with an adequate delay time, the energy required for writing can be further decreased, thereby causing efficient charge transfer.

According to a second embodiment of the present invention, there is provided an optical recording device which comprises a recording medium made of a thin organic film containing donor and acceptor molecules and records a change in optical characteristics caused by charge transfer between the donor and acceptor molecules, characterized in that the thin organic film contains a plurality of at least either the donor or acceptor molecules, and information writing and erasing are performed by light irradiation.

In the optical recording device of this type, the recording medium can have a stack-layered structure wherein, between a first thin film (monolayer of donor molecule) containing donor molecules and a second thin film (monolayer of acceptor molecule) containing acceptor molecules, a third thin film containing acceptor molecules, a third thin film containing acceptor molecules and a type different from that of the acceptor molecules contained in the second thin film is present. Alternatively, a built-up substructure of each monolayers wherein, between a first thin film containing donor molecules and a second thin film containing acceptor molecules, a third thin film containing donor molecules of a type different from that of the donor molecules contained in the first thin film is present, is repeated to constitute a stack layer structure, thus providing a recording medium.

Information writing is performed by irradiating light having a predetermined wavelength onto such a recording medium and changing the donor and acceptor molecules to an ionic state. Information erasing is performed by irradiating long-wavelength light or white light having a high intensity and returning the donor and acceptor molecules from the ionic to neutral state. An erasable recording device is thus provided.

In such a recording medium, as a result of charge transfer by light irradiation, the absorption spectrum of the molecules is shifted to the long wavelength region. Then, molecules that absorbed light in an ultraviolet range in the neutral state now absorb light in a visible range, and molecules that absorbed light in the visible range now absorb light in an infrared range, thus changing the reflectance and refractive index of the recording medium. More specifically, information is recorded as a change in transmittance and reflectance of the recording medium. In this case, in the second embodiment of the present invention, between a donor molecule film and an acceptor molecule for causing a charge transfer therebetween, a thin film containing donor or acceptor molecules of a type different from that in the donor molecule film or the acceptor molecule film is provided, in order to improve the writing efficiency and to hold the ionic state, i.e., the writing condition, more stably. Since another insulating molecule film is provided between the donor and acceptor molecule films, the recording condition can be held more stably. Molecules which have changed from a neutral state to an ionic state can be returned to the neutral state by irradiating long-wavelength light or white light having a high intensity. This corresponds to the information erasing operation.

According to the second embodiment of the present invention described above, information writing and erasing do not involve a large conformational change and a bond cleavage in a molecule. This is different from the conventional heat mode recording of or light recording of the photon mode which utilizes a change in extinction modulus or reflectance caused by the structural change of a molecule. High-quality information writing and erasing are thus enabled. Since a change in extinction modulus, reflectance, reflective index or the like due to the charge transfer is large, an expensive optical system is not required for light recording, an inexpensive organic material can be used as a material of the recording medium, and an inexpensive recording device can be provided. Also, when a change in extinction modulus, reflectance, refractive index or the like of the recording medium is optically read as information, reading with a high S/N ratio can be performed.

In the second embodiment of the present invention, an external electric field can be effectively used, as in the first embodiment. More specifically, when an external electric field is applied in a direction to enhance charge transfer, writing and erasing efficiency can be improved. When an external electric field is applied in a direction to interfere with charge transfer, information damage caused by repeated reading can be prevented. Furthermore, when electrodes for applying the external electric field are provided, an insulating molecule film is preferably also provided between the electrode and the thin organic film. This prevents charge transfer from the electrode to the thin organic film and improves the charge transfer efficiency between organic molecules and the holding performance of the recording condition.

According to a third embodiment of the present invention, there is provided an optical recording device which comprises a thin organic film, containing donor and acceptor molecules, as a recording medium, and records a change in optical characteristics caused by charge transfer between the donor and acceptor molecules as information, wherein the optical recording device contains a plurality of types of at least either the donor or acceptor molecules, and two or more types of beams having different wavelengths are irradiated to cause charge transfer between the donor and acceptor molecules in different wavelength ranges, thereby recording information in a multiplex manner.

In accordance with the principle of the information multiplex recording of the third embodiment, charge transfer is caused between donor and acceptor molecules of a specific combination by excitation by light having a specific wavelength, and between donor and acceptor molecules of another combination by excitation by light having another wavelength. In the third embodiment, as a light source suitable for information recording, various types of gas lasers ranging from ultraviolet to range, a dye laser which is pumped by various methods, a semiconductor laser, and monochromatic light obtained by decomposing light from a white light source such as an Xe lamp, can be used. In fine, a light source can be arbitrarily selected as far as it corresponds to the wavelength, where the neutral state of the molecules constituting the recording medium layer have absorption bands.

In the recording medium according to the third embodiment of the present invention, as a result of charge transfer by light irradiation onto the recording medium, the absorption spectrum of the molecules is shifted to the long-wavelength range, molecules that exhibit absorption in the ultraviolet range in the neutral state now exhibit absorption extending to the visible range, and molecules that exhibit absorption in the visible range in the neutral state now exhibit absorption extending to the infrared range. The reflectivity and refractive index of the recording medium are also changed. Namely, information is recorded as a change in light transmittance or reflectivity. In this case, according to the present invention, a plurality of combinations of donor and acceptor molecule films for charge transfer are provided. The respective combinations are excited by irradiating light having corresponding wavelengths, thus performing information recording in a multiplex manner.

Therefore, according to the third embodiment of the present invention, information can be recorded in a three-dimensional manner by, e.g., recording specific information in a specific layer with light having wavelength $\lambda 1$ and another specific information in another specific layer with light having wavelength $\lambda 2$. As a result, high-density recording is enabled more effectively, compared to various types of conventional optical recording devices that perform information recording in a two-dimensional manner. Other advantages of the third embodiment are the same as those of the second embodiment described above.

It is preferable that the thin organic film of the present invention is formed by the LB process. In particular, the thin organic film preferably has a super lattice structure having a plurality of stacked layers each consisting of donor and acceptor molecule films. The thickness of the donor or acceptor molecule film is preferably 5 to 500 Å, and more preferably 5 to 100 Å. In order to hold the recording state, i.e., the state wherein donor and acceptor molecules are ionized by charge transfer, more stably, a thin organic film (insulating molecule film) containing electrically inactive insulating molecules is preferably provided between the donor and acceptor molecule films. The insulating molecule here means an organic molecule having a small electron density of, e.g., non-localized $\pi$-electron or un-paired n-electron.

The following donor molecules can be used as the donor molecules used in the present invention.

(1) Fulvalene type donors having the undermentioned structural formulas:

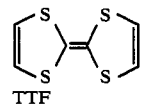
TTF

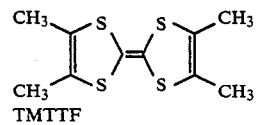
TMTTF

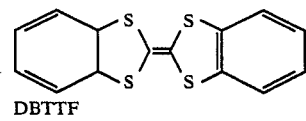
DBTTF

-continued

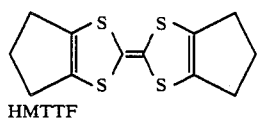
HMTTF

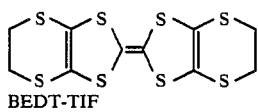
BEDT-TIF

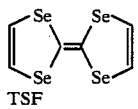
TSF

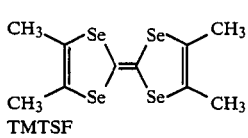
TMTSF

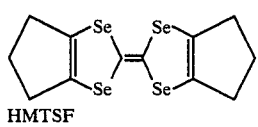
HMTSF

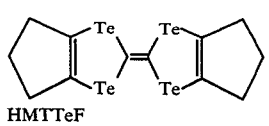
HMTTeF (2) S-containing heterocyclic donors having the undermentioned structural formulas:

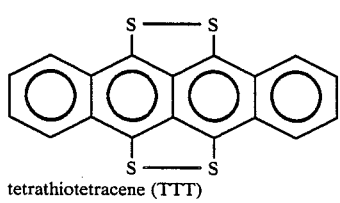
tetrathiotetracene (TTT)

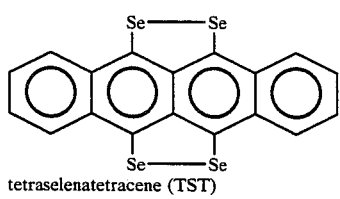
tetraselenatetracene (TST)

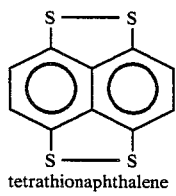
tetrathionaphthalene

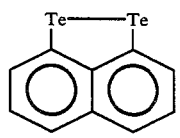

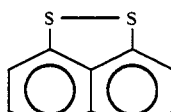
tetrathioperillene

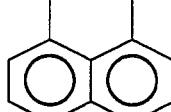
tetraphenyl-bithio pyralydene (BTP)

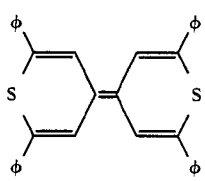

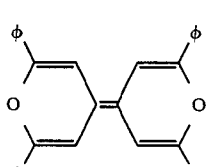

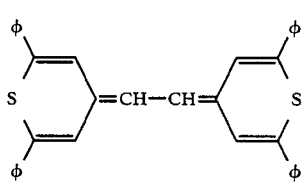

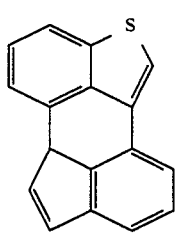
bizenzothiophene (BBT)

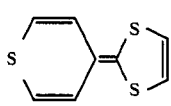

Note:
φ given in the above formulas represents a phenyl radical.

(3) Amine type donors having the undermentioned structural formulas:

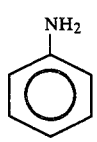
aniline

-continued
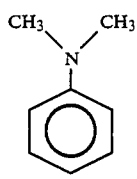
N—methyl aniline
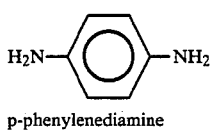
p-phenylenediamine
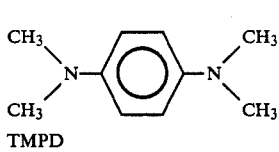
TMPD
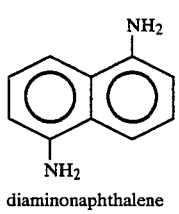
diaminonaphthalene
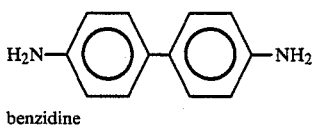
benzidine
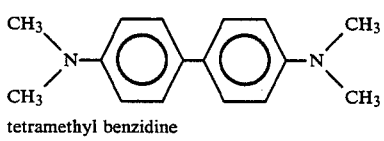
tetramethyl benzidine
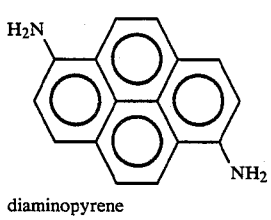
diaminopyrene
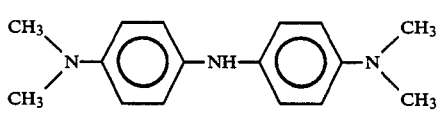
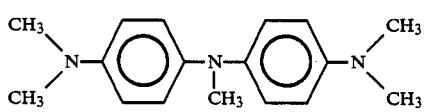
(4) Metal compound type donors having the undermentioned structural formulas:
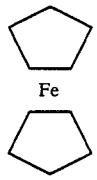
ferrocene
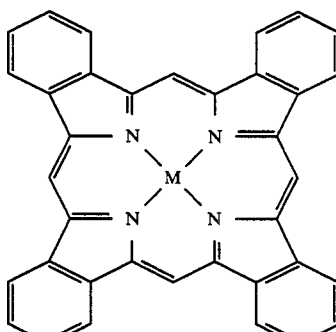
phthalocyanine M(Pc)
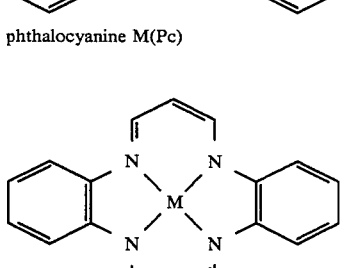
M(dbtaa)
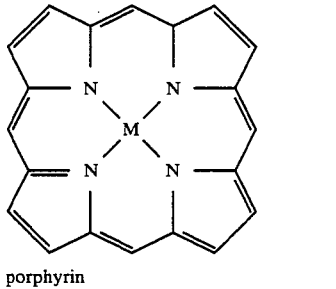
porphyrin
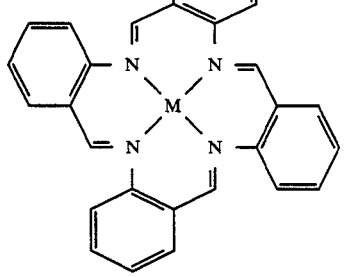
M(TAAB)

-continued
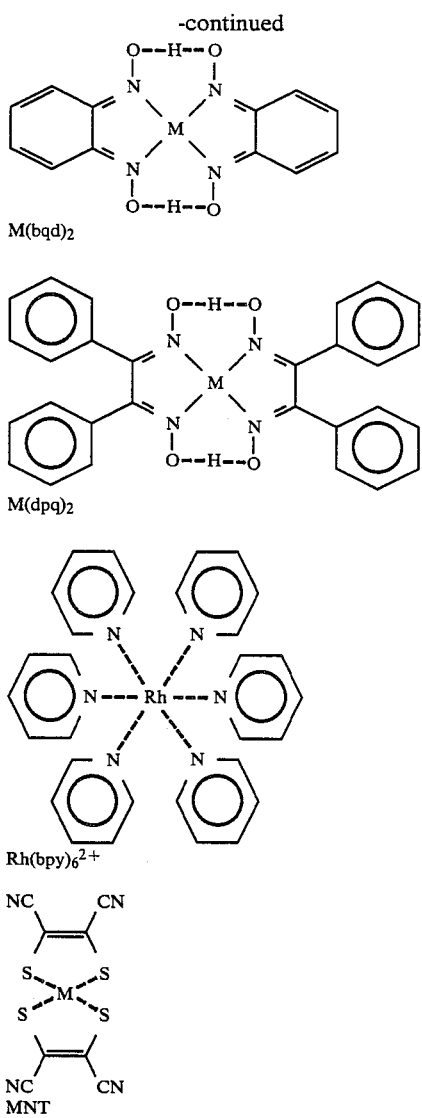
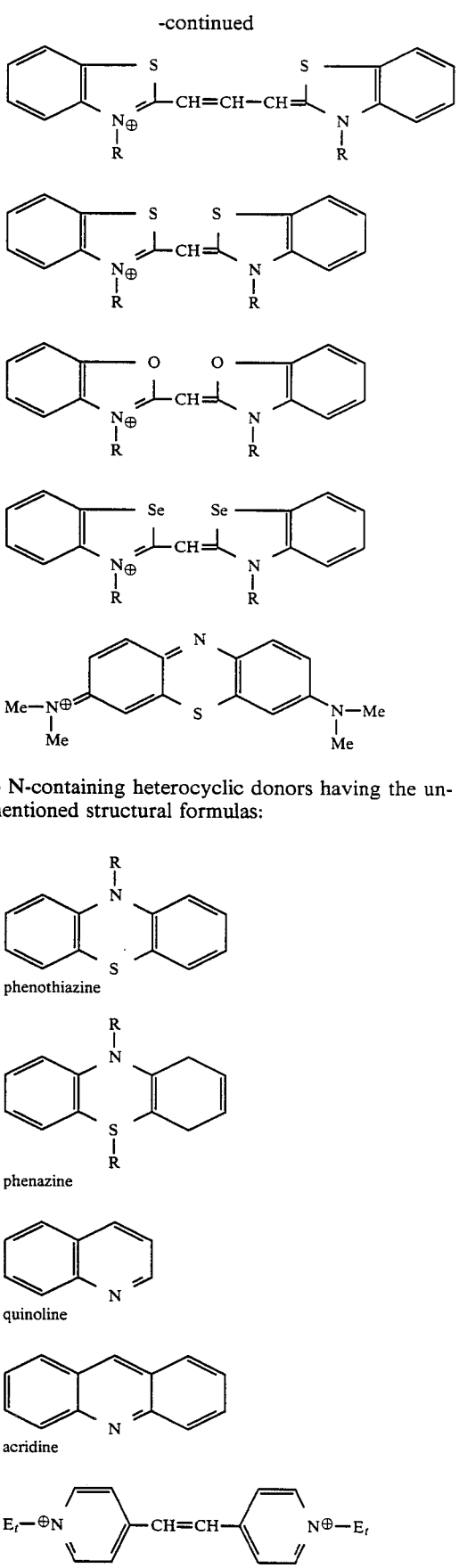
(5) Cyanine coloring matter donors having the undermentioned structural formulas:
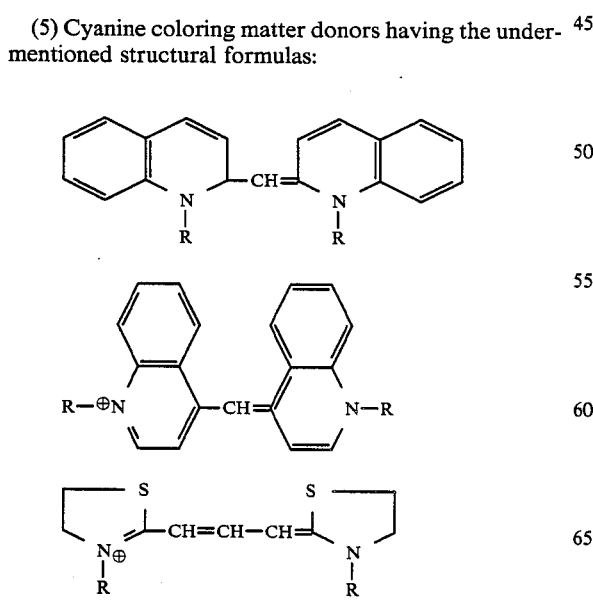
(6) N-containing heterocyclic donors having the undermentioned structural formulas:

DEPE²⁺

(7) Polymer type donors having the undermentioned structural formulas:

polyacetylene

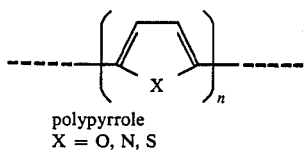

polypyrrole
X = O, N, S

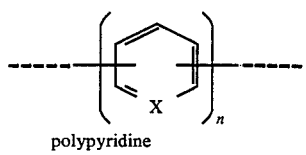

polypyridine

poly-p-phenylene

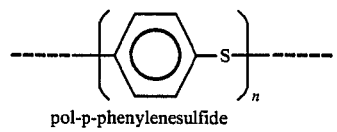

pol-p-phenylenesulfide

The present invention allows for the application of the derivatives of the donor type molecules indicated in items (1) to (7), which have a hydrophobic group with a structural formula $CH_3(CH_2)_{\overline{n}}$, $CH_3(CH_2)_{\overline{p}}(CH_2=CH_2)_{\overline{q}}(CH_2)_{\overline{l}}$ (where n and p+q+l respectively represent larger numbers than 8), or a hydrophilic group with a structural formula of —COOH, —OH, SO₃H, —COOR', —NH₂, —N⊕(R')₃Y⁻ (Y denotes halogen ions), or have both said hydrophobic and hydrophilic groups.

Among the aforementioned donor molecules, amine type donors are preferred, but fulvalene type donors and S-containing heterocyclic compound are more preferred.

The above-mentioned acceptor molecules include the following:

(1) Cyano compound type acceptors having the undermentioned structural formulas:

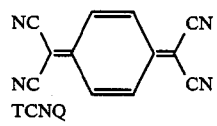
TCNQ

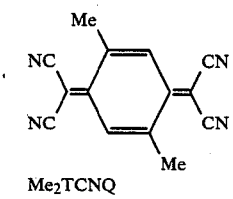
Me₂TCNQ

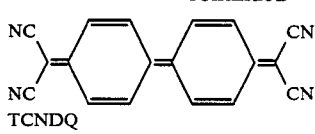
TCNDQ

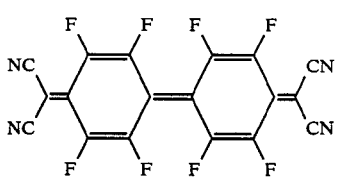

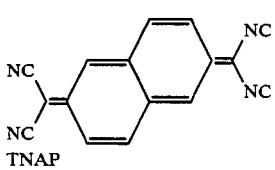
TNAP

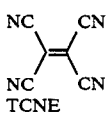
TCNE

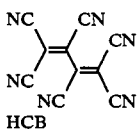
HCB

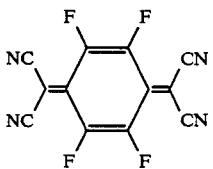

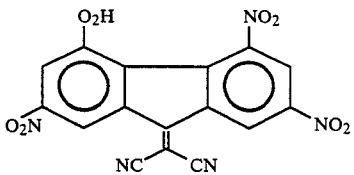

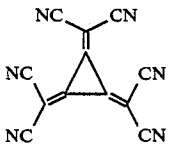

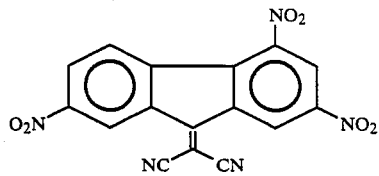
DTF

dicyanobenzene
(DCNB)

(2) Quinone type acceptors having the undermentioned structural formulas:

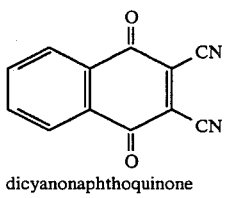
dicyanonaphthoquinone

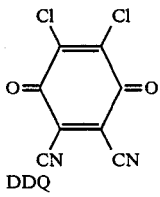
DDQ

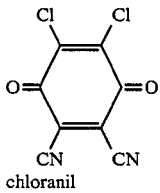
chloranil

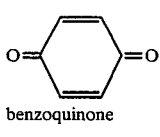
benzoquinone

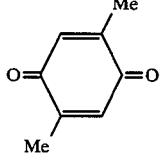
2,5-dimethylbenzoquinone

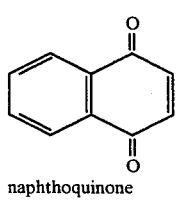
naphthoquinone

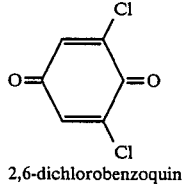
2,6-dichlorobenzoquinone

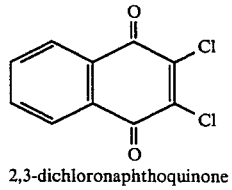
2,3-dichloronaphthoquinone (3) Nitro-compound type acceptors having the undermentioned formulas:

p-nitrocyanobenzene

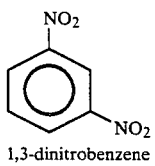
1,3-dinitrobenzene

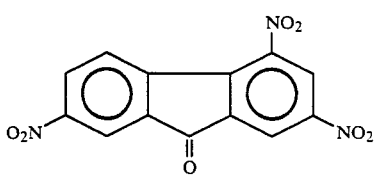
TNF

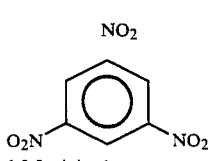
1,3,5-trinitrobenzene

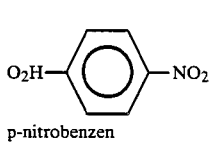
p-nitrobenzen

The present invention allows for the application of the derivatives of the acceptor type molecules having the essential structural formula indicated in items (1) to (3), which have hydrophobic radicals represented by $CH_3(CH_2)_n$, $CH_3(CH_2)_p(CH_2=CH_2)_q(CH_2)_r$ (where n and a total of p+q+1 respectively denote a larger number than 8), or hydrophilic radicals represented by —COOH, —OH, —SO$_3$H, —COOR', —NH$_2$, —N$^\oplus$(R')$_3$Y$^-$ (Y denotes halogen ions), or have both such hydrophobic and hydrophilic radicals.

Among the above-listed acceptor molecules, quinone type donors are preferred and cyano compound type donors are more preferred.

The above-mentioned insulating or inactive organic molecules include the undermentioned types.

(1) Substitutable saturated or unsaturated hydrocarbon derivatives which are expressed by the following general structural formula:

R—X where R represents a hydrophobic group formed of substitutable $CH_3(CH_2)_n$- or $CH_3(CH_2)_p(CH_2=CH_2)_q(CH_2)_r$ (where n and a total of p+q+1 respectively represent a larger number than 8), and X represents hydrophilic radicals, including, for example, —COOH, —OH, —SO$_3$H, —COOR', —HN$_2$, —N$^\oplus$(R')$_3$Y$^-$ (Y represents halogen ions).

(2) Various polymerizable molecules

The subject polymerizable molecules may be represented, for example, by:

polymers of vinyl compound such as substitutable acrylate, methacrylate, vinyl ether, styrene, vinyl alcohol, acrylamide, acryl;

α-amino acids such as alanine, glutamate, aspartate;

amino acids, for example, ε-aminocaprolate other than α-amino acid; and polyamide polymers composed of a 1:1 mixture of diamines, such as hexamethylene diamine, and carbonic acid, such as hexamethylene diamine.

If possessed of a property of being fabricated into a film by themselves, the above-mentioned molecules (2) can be applied intact. The molecules which can not be fabricated into a film by themselves are applied when mixed with the insulating molecules (listed in item (1)) which can be independently formed into a film.

BRIEF DESCRIPTION OF THE DRAWINGS

FIG. 15 is a view showing a writing system according to the third embodiment of the present invention;

FIG. 16 is a view schematically showing a writing state of the recording medium shown in FIG. 13.

DETAILED DESCRIPTION OF THE PREFERRED EMBODIMENT

The principle of charge transfer in the super thin film hetero structure of the organic molecules used in the present invention, i.e., a charge transfer phenomenon from donor to the adjacent acceptor molecule in the films, will first be described with reference to FIGS. 1 and 2.

Figure 1:
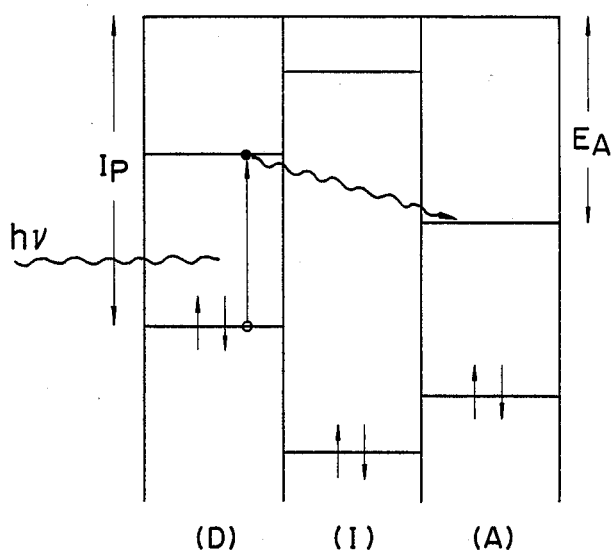
FIGS. 1 and 2 are views for explaining a basic principle of the present invention.
Figure 2:
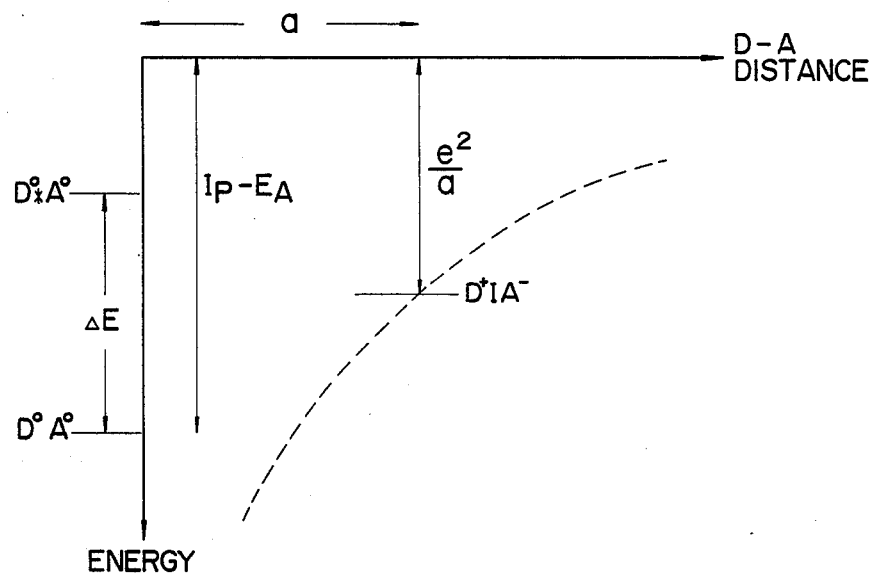

FIG. 1 is an energy state diagram showing a state wherein insulating molecule film I having thickness a is provided between donor molecule film D, having an ionization potential Ip, and acceptor molecule film A, having electron affinity $E_A$. As shown in FIG. 2, when light having such an absorption wavelength that it can be absorbed by the donor molecule film is irradiated in state $D°A°$, wherein the respective molecules are neutral, the structure is shifted to state $D*°A°$, wherein donor molecules are selectively excited. In state $D*°A°$, part of the structure is returned to the ground state and its other part is shifted to state $D^+IA^-$, wherein charge transfer is caused. Note that $D^+IA^-$ indicates a state wherein donor and acceptor molecules have respectively been changed positive and negative ionic states, with insulating molecule film I sandwiched therebetween. In order to allow the latter process, the energy in state $D^+IA^-$ must be lower than that in state $D*°A°$, i.e., $$Ip = E_A - \Delta E \leqq e^2/a \tag{1}$$

must be satisfied.

The transition speed from state $D*°A°$ to $D^+IA^-$, conversion efficiency, and recording stability depend on the electron affinity and thickness of insulating molecule film I. When a third organic molecule film (donor molecule film or acceptor molecule film) is provided in place of or in addition to film I, the conversion efficiency becomes higher and more stable recording is possible.

When an external voltage is applied to the stack layer structure shown in FIG. 1, the condition for causing a process of transition from state $D*°A°$ to $D^+IA^-$ is:

$$Ip - E_A - \Delta E \leqq e^2/a + e\phi \tag{2}$$

In other words, the process from state $D*°A°$ to $D^+IA^-$ can be controlled by the direction and intensity of the external electric field. Therefore, memory damage during efficient writing and recording can be prevented by applying an external voltage.

Figure 3:
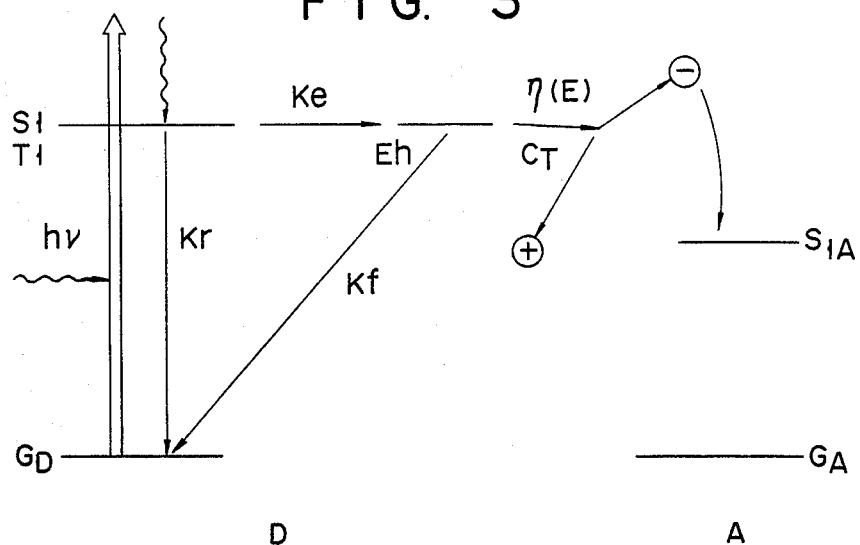
FIG. 3 is a view for explaining a principle of information writing of the present invention.

This will be described in more detail with reference to the energy model shown in FIG. 3.

More specifically, when donor molecules D are selectively excited by light energy $h\nu$, which is higher or similar to the energy of the lowest excited singlet state $S_1$, the relaxation process of the excitation undergoes a radiationless process or a fluorescence process (rate constant: Kr), to ground state $G_D$, or a phosphorescence relaxation process (rate constant: Df), which returns to the ground state after intersystem crossing via the triplet state Eh. Assume that an external electric field is applied during the relaxation process. Then, transition of the electron-hole pairs formed by the excitation from state Eh (rate constant: Ke) to state $C_T$ occurs at constant rate $\eta(E)$, and electrons migrate to acceptor molecules nearby and holes migrate to donor molecules in the neutral state, as a result of the electric field (charge transfer state).

This charge transfer state can be caused only by light excitation without applying an external electric field. In this case, however, after the electron-hole pairs are formed in state Eh, as described above, relaxation (quantum yield $\phi$) thereof to the initial ground state ($G_D$ and $G_A$) occurs prior to other transitions, and the recording state is instantaneously extinguished by the following reaction scheme:

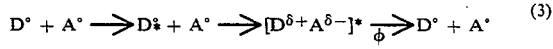

In excitation and relaxation processes of the donor molecules, the value of quantum yield is expressed as:

$$\phi(O) = Kf/(Kr + Ke + Kr) \quad (4)$$

when no bias is applied. In contrast to this, when a voltage is applied as in the first embodiment of the present invention, electron-hole dissociation occurs at rate $\eta(E)$, and the quantum yield for the relaxation to the initial state is thus considerably decreased as expressed as follows:

$$\phi(E) = [\phi(O) - \eta(E)]/\phi(O) \quad (5)$$

It is also possible to cause a charge transfer state only by applying an electric field without light excitation. In this case, however, an energy required for forming electron-hole pairs, i.e., precursors of charge transfer is about:

$$V = [(Ip - E) - (e^2/F)]/e \quad (6)$$

in voltage. Accordingly, in order to sufficiently increase the ratio of charge transfer and to raise the recording contrast, an organic thin film must have a very high threshold voltage of about $10^7$ V/cm, which cannot be adopted from a practical point of view.

Various Examples of the present invention will be described.

EXAMPLE 1

Figure 4:
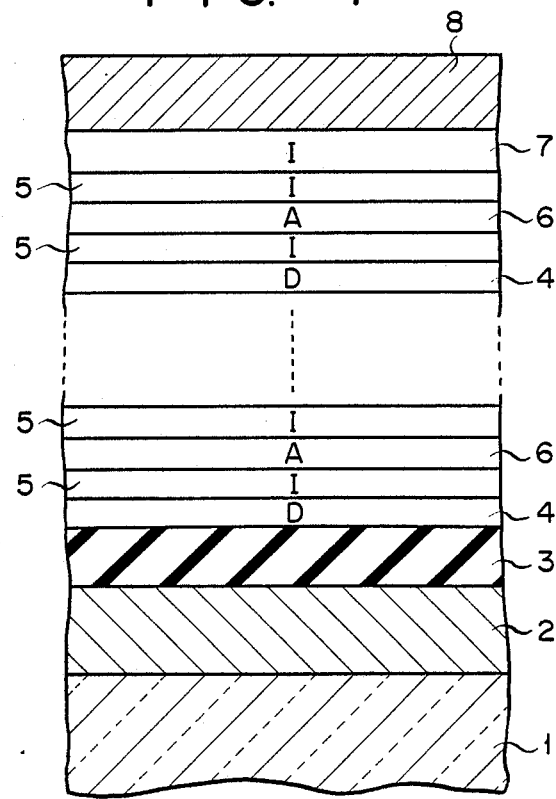
FIG. 4 is a sectional view showing a recording medium according to a first embodiment of the present invention.

FIG. 4 shows an arrangement of a recording medium according to a first embodiment of the present invention. Referring to FIG. 4, 150-Å thick NESA (a transparent conductive electrode) film 2 was formed on glass substrate 1, and 500-Å thick SiO$_2$ film 3 was formed on film 2. A stack layer of donor molecule film 4, insulating molecule film 5, and acceptor molecule film 6, was repeatedly formed on the resultant structure by the LB process to provide a super lattice structure, and Al electrode 8 was formed thereon.

An LB film was formed in the following manner. 2,2',6,6'-isopropylamine-substituted tetraphenylbipyrane-4-ylydine was dissolved as donor molecules in chloroform to prepare an LB film spreading solution. It was seen from a surface pressure area per one molecule curve that a solid condensed phase of the molecule was formed at 15 dyne/cm. A commercially available vertical dipping type LB film forming system was used, and the water subphase was set to pH=6.0 at a temperature of 23° C. and had a cadmium concentration of 0.01 mM before spreading the molecule. A NESA film/SiO$_2$ film was formed on a glass substrate, and the resultant substrate was placed in the water phase. The film-forming molecules were developed and the film was deposited onto the substrate at a rate of 70 μm/sec to build-up donor molecule film 4. Subsequently, following the same procedures, insulating molecule film 5 of arachic acid was formed at a surface pressure of 25 dyne/cm, and a mixture film consisting of tetracyanoquinodimethane and stearic acid at a mixing molar ratio of 1:1 was formed as acceptor molecule film 6 thereon. These operations were sequentially repeated a plurality of times to stack four donor molecule films 4, seven insulating molecule films 5, and four acceptor molecule films 6. Polyphenyl alanine (molecular weight: 120,000) dissolved in chloroform was built up to form three layers on the resultant LB stack layer at a surface pressure of 23 dyne/cm, and insulating molecule film 7 was formed thereon. The resultant structure was set in a conventional vacuum evaporation system to deposit Al electrode 8 having a thickness of about 150 Å in a vacuum of $3 \times 10^{-6}$ Torr.

While a bias voltage was applied to the thus-formed recording medium setting Al electrode 8 as the positive side, an He-Ne laser ($\lambda = 633$ nm, 1 mW/mm$^2$) was irradiated in a spot-like manner at different positions with a cycle of 10 nsec. Absorption at a wavelength of 840 nm was observed at a laser radiation portion, i.e., recording portion.

Figure 5:
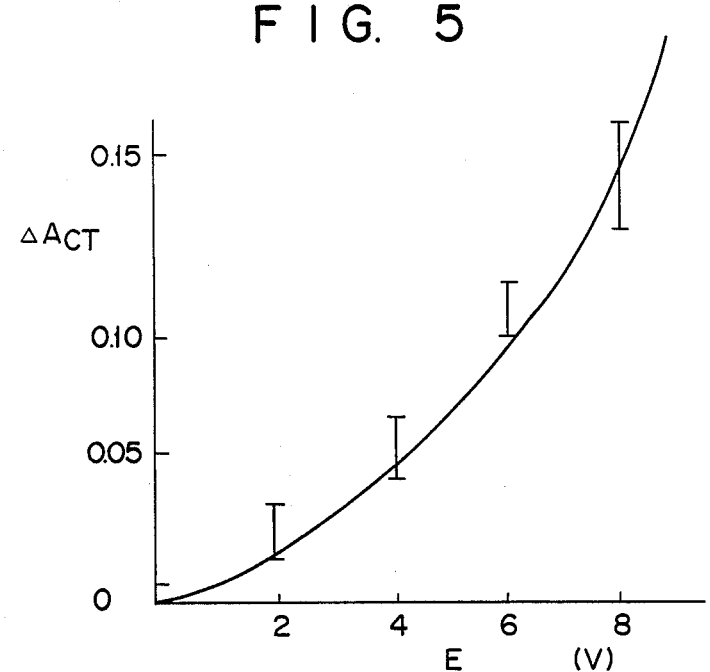
FIG. 5 is a graph showing writing characteristics of the recording medium shown in FIG. 4.

FIG. 5 shows a result obtained by measuring the absorbance change $\Delta A_{CT}$ for a wavelength of 850 nm at a recording portion by changing a bias voltage to be applied. As is apparent from FIG. 5, when the bias voltage is increased, the absorption strength is considerably increased. As a result, it is seen that when light excitation is performed while applying a bias voltage, a high-speed, highly efficient information recording can be performed.

It was also confirmed that the stability of the information recorded in this manner as a difference in light absorption characteristics were stable, and that information recorded in this manner could be optically read out with a good S/N ratio.

EXAMPLE 2

Figure 6:
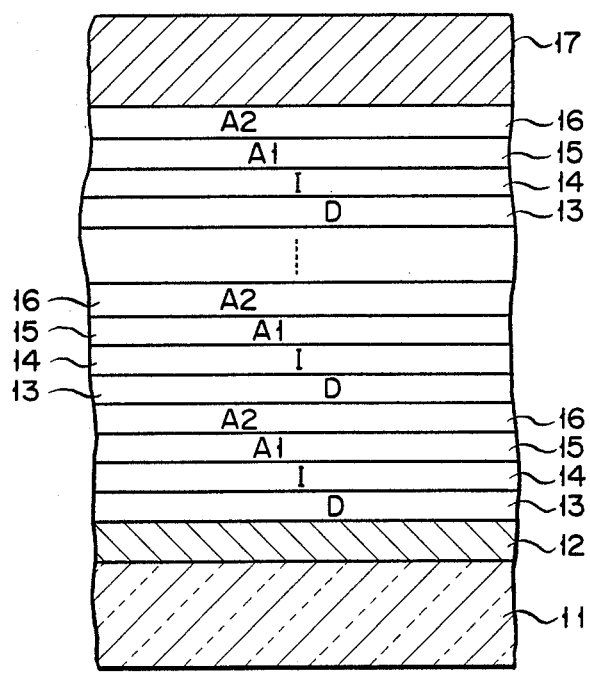
FIG. 6 is a sectional view showing a recording medium according to a second embodiment of the present invention.

FIG. 6 shows an arrangement of a recording medium according to a second embodiment of the present invention. Referring to FIG. 6, 150-Å thick nesa film 12 was formed on glass substrate 11. A stack layer of donor molecule film (first organic thin film) 13, insulating molecule film 14, acceptor molecule film (third organic thin film) 15, and acceptor molecule film (second organic thin film) 16, containing acceptor molecules having a larger electron affinity than that of film 15, was repeatedly formed on the resultant structure by the LB process to provide a super lattice structure, and Au electrode 17 was formed thereon.

An LB film was formed in the following manner. 2,2',6,6'-isopropylamine-substituted tetraphenylbipyrane-4-ylydine was dissolved as donor molecules in chloroform to prepare an LB film spreading solution. It was seen from a surface pressure area per one molecule curve that the film-forming molecules constituted a solid, dense film at 15 dyne/cm. A commercially available vertical dipping type LB film forming system was used, and the water subphase was set to pH=6.0 at a temperature of 23° C. and had a cadmium ion concentration of 0.01 mM. A NESA (indium and tin oxide) film was formed on a glass substrate, and the resultant substrate was placed in the trough. The film-forming molecules were spreaded over the subphase and the film was build up at a dipping and pulling rate of 70 μm/sec to form donor molecule film 13. Subsequently, following the same procedures, insulating molecule film 14 of arachic acid was formed at a surface pressure of 25 dyne/cm, and a film consisting of the mixture of tetracyanoquinodimethane and stearic acid at a molar ratio of 1:1 was formed as acceptor molecule film 15. Acceptor molecule film 16, comprising a mixture film consisting of tetracyanoethylene and stearic acid that are acceptor molecules having a larger electron affinity than that of film 15, was formed thereon by the same procedures as described above. These operations were sequentially repeated a plurality of times to build up ten donor molecule films 13, insulating molecule films 14, and acceptor molecule films 15 and 16, respectively. The resultant structure was set in a vacuum deposition system to deposit Au electrode 17 in a vacuum of $3 \times 10^{-6}$ Torr.

Figure 7:
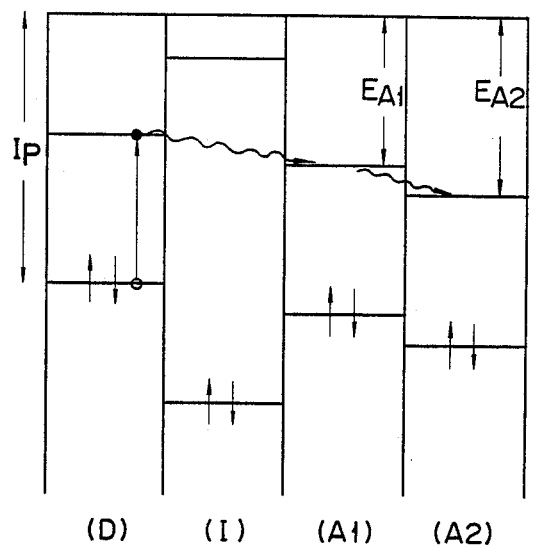
FIG. 7 is an energy state diagram of the recording medium shown in FIG. 6.

FIG. 7 is an energy state diagram of a unit stack layer structure of a recording medium having the arrangement as described above. When light having a predetermined wavelength is irradiated to excite donor molecule film D, electrons formed therein migrate from insulating molecule film I to acceptor molecule film $A_2$ through acceptor molecule film $A_1$, and are set in an ionic state. This corresponds to a writing state. Since films I and $A_1$ are provided between film D and $A_2$, the recording condition can be stably held and efficient writing can be performed.

Experimental data will be described in more detail. While a voltage was applied at a period of 500 nsec setting Au electrode 17 as the positive side, an He-Ne laser (wavelength $\lambda = 633$ nm, 1 mW/mm$^2$) was irradiated at different positions in a spot-like manner at a period of 10 nsec.

Figure 8:
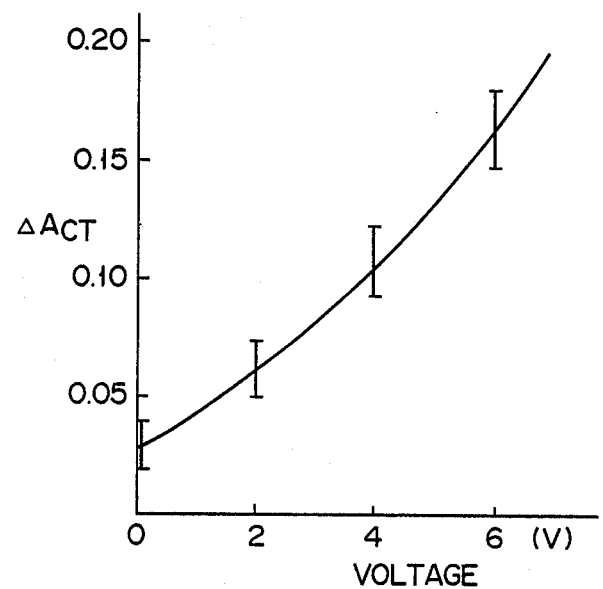
FIG. 8 is a graph showing dependency of a change, upon writing in extinction modulus of the recording medium shown in FIG. 6, on an application of voltage.

FIG. 8 shows a result obtained by measuring absorption strength $\Delta A_{CT}$ for a wavelength 850 nm at a recording portion by changing a bias voltage to be applied. The absorption strength was measured at light output of 10 $\mu$W/mm$^2$. As is apparent from FIG. 8, when the bias voltage is increased, the absorption strength is considerably increased. As a result, it is seen that, when light excitation is performed while applying a bias voltage, efficient information recording can be performed.

The holding characteristics of information recorded as a difference in the light absorption characteristics in this manner were stable, and were not changed even when the recording medium was left to stand in air for a month.

Figure 9:
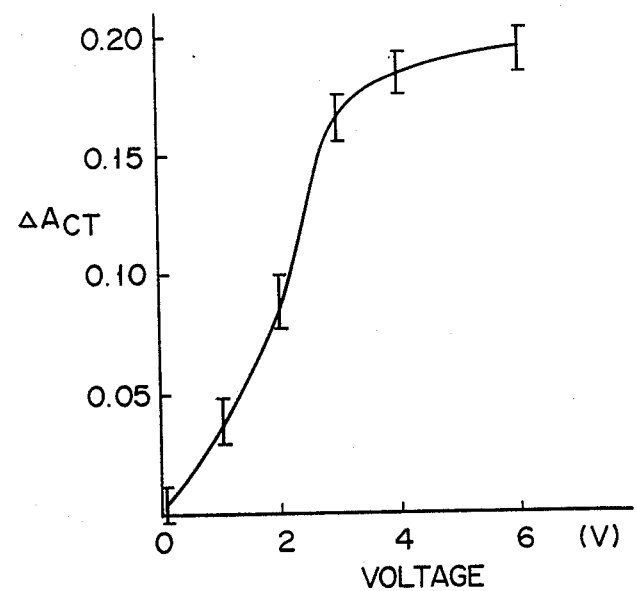
FIG. 9 is a graph showing dependency of a change, upon reading in extinction modulus of the recording medium shown in FIG. 6, on an application of voltage.

In order to confirm the stability of the recording condition, a pulse laser beam ($\lambda = 850$ nm) of 10 $\mu$W/mm$^2$ and 1 sec was irradiated $10^4$ times at intervals of 1 nsec in a non-bias state. The absorption strength for a wavelength of 850 nm was decreased to 0.005. In contrast to this, when a reverse bias voltage was applied and the same experiment was performed, it was found that the recording condition was held in a good state. FIG. 9 shows the result of this experiment. It is seen from FIG. 9 that when reading is performed while applying a voltage exceeding 3 V, substantially no destruction occurs in the storage contents by a reading operation.

While a reverse bias voltage of 3 V was applied to the recording medium in which information had been written, light of a Xenon lamp of 1 mW/mm$^2$ was irradiated for 1 minute. The absorption strength for a wavelength of 850 nm was decreased to 0.001 or less. In this manner, information can be erased by light irradiation.

As described above, according to this embodiment, a reversible information recording device capable of recording and erasing information by light irradiation can be obtained. In this recording device, a change in the light absorption rate which occurs as a result of the charge transfer phenomenon is significant. Therefore, this recording device does not require an expensive optical system. Moreover, the recording medium of the recording device contains inexpensive organic molecules, the device has a good S/N ratio and excellent versatility. Between donor and acceptor molecules in the layered structure of films, which perform charge transfer, an acceptor molecule film using different acceptor molecules is provided, together with an insulating molecule film. Therefore, a recording device having a good writing efficiency and stable holding characteristics for recording conditions can be obtained. In particular, when an appropriate bias voltage is applied upon writing, erasing, and reading, more efficient writing/erasing characteristics and more stable holding characteristics for recording conditions can be obtained.

Figure 10:
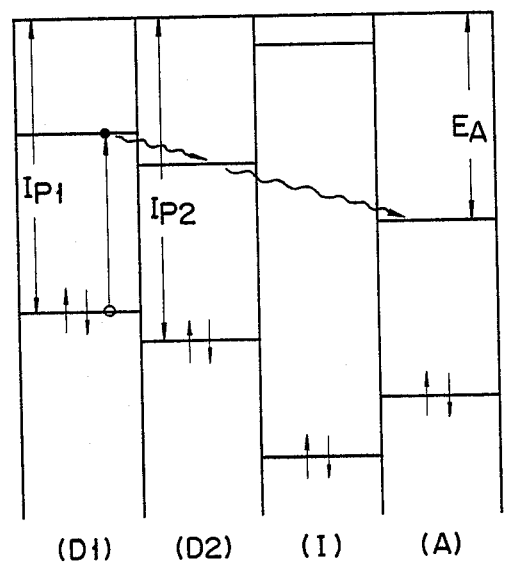
FIGS. 10 to 12 are energy state diagrams of various modifications of the second embodiment of the present invention.
Figure 11:
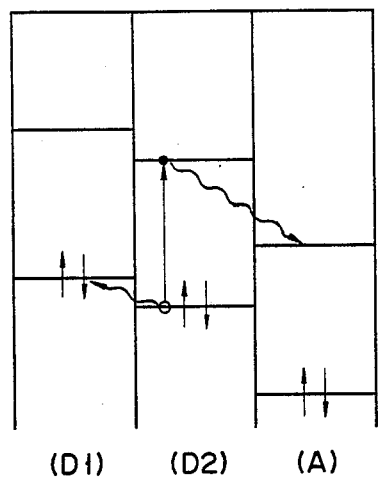
Figure 12:
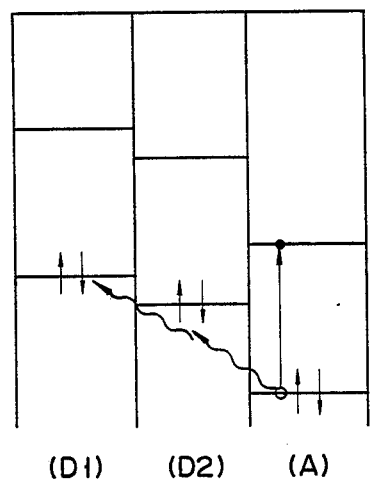

The present invention is not limited to the above embodiments but can be modified and embodied in various manners. FIGS. 10 to 12 show arrangements of unit organic thin film stack layer structures according to other embodiments in correspondence with the energy state diagram of FIG. 7 of the embodiment described above.

FIG. 10 shows a case wherein two types of donor molecule films and one type of acceptor molecule film are used. More specifically, between donor molecule film $D_1$ and acceptor molecule film A, donor molecule film $D_2$, which has ionization potential $I_{p2}$ higher than ionization potential $I_{p1}$ of film $D_1$, is provided together with insulating molecule film I. With this stack layer structure, efficient writing and erasing characteristics, and stable characteristics for holding recording conditions can be obtained in accordance with the same principle as the embodiment described above.

FIG. 11 shows a case wherein the insulating molecule film shown in FIG. 10 is omitted and two types of donor molecule films $D_1$ and $D_2$ and acceptor molecule film A are used. In this case, when writing light having a selected wavelength is used to excite central film $D_2$, the electrons and holes migrate to film A and $D_1$, respectively, as shown in FIG. 11, thereby providing an ionic state, i.e., a writing state. In this embodiment, an insulating molecule film is not used. However, when the thickness and ionization potential of central film $D_2$ are appropriately selected, stable holding characteristics for recording conditions can be obtained.

FIG. 12 shows a case of the same structure as FIG. 11, wherein information can be written by optically exciting acceptor molecule film A.

In addition to the embodiments shown in FIGS. 10 to 12, it is possible to combine two types or more or three types or more of each of donor and acceptor molecule films, thus providing a stack layer structure. It is also possible to use an organic molecule which contains both donor and acceptor groups, or to use a thin film containing both donor and acceptor molecules.

EXAMPLE 3

Figure 13:
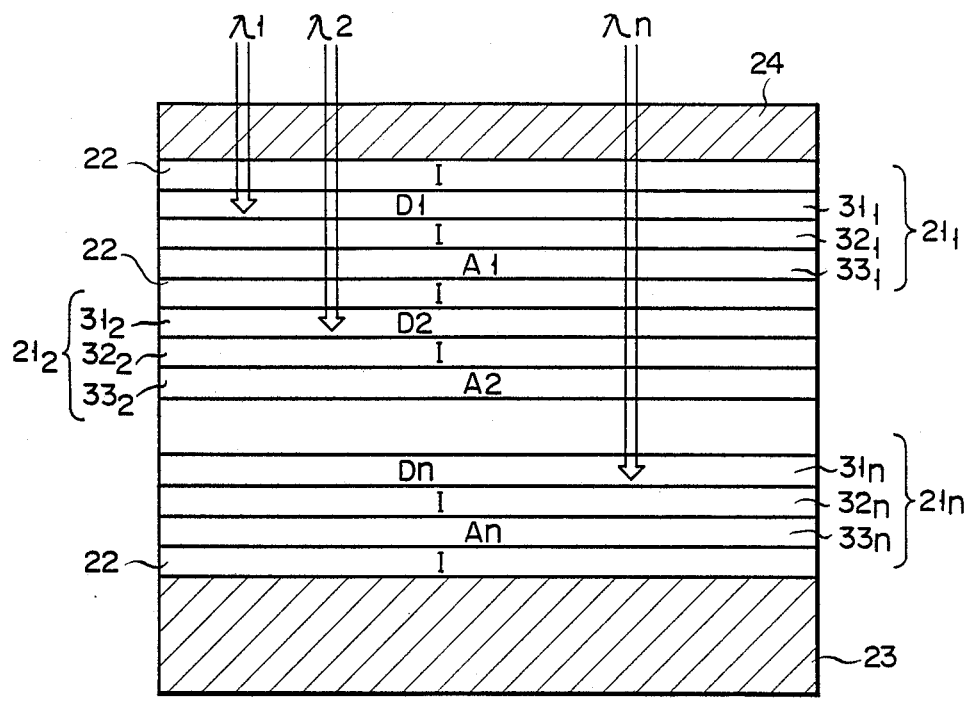
FIG. 13 is a sectional view showing a recording medium according to a third embodiment of the present invention.

FIG. 13 schematically shows an arrangement of an information recording medium according to a third embodiment of the present invention. Reference numeral 23 denotes a substrate, e.g., a glass substrate having a nesa film formed thereon. A super lattice film is formed on substrate 23 by the LB process, and electrode 24 is formed thereon. More specifically, the super lattice film is formed by stacking first, second, . . . and nth recording layers $21_1, 21_2, \ldots$ and $21_n$ through insulating molecule films 22. First layer $21_1$ is formed by stacking donor molecule film $31_1$, containing first donor molecules $D_1$, and acceptor molecule film $33_1$, containing first acceptor molecules $A_1$, through insulating film $32_1$. Second layer $21_2$ is formed by stacking donor molecule film $31_2$, containing second donor molecules $D_2$, and acceptor molecule film $33_2$, containing second acceptor molecules $A_2$, through insulating film $32_2$. In this manner, a plurality of recording layers, having different light absorption characteristics by different combinations of donor and acceptor molecule films, are stacked.

Figure 14A:
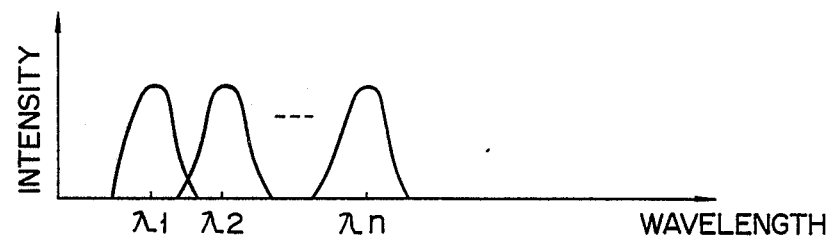
FIGS. 14A and 14B are graphs showing light absorption characteristics of the recording medium shown in FIG. 13 before and after writing.
Figure 14B:
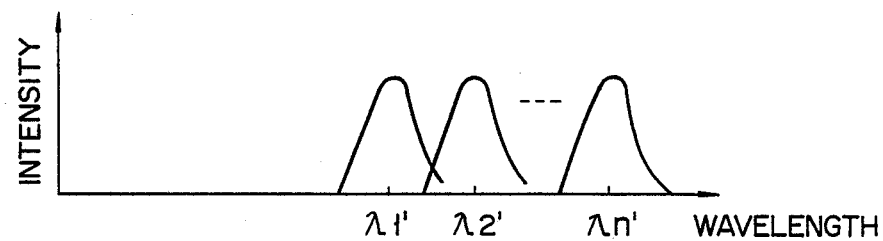

Information is recorded in the recording medium having the above arrangement in the following manner. FIGS. 14A and 14B show light absorption characteristics of this recording medium. FIG. 14A shows the characteristics of the recording medium in which no information has been recorded. The absorption peak of wavelength λ1 corresponds to the donor molecule film first layer $21_1$, that of wavelength λ2 corresponds to the donor molecule film of second layer $21_2$, . . . and that of wavelength λn corresponds to the donor molecule film of nth layer $21_n$. Assume that information is written in the recording medium having such absorption characteristics by using light having wavelength λ1. In this case, charge transfer occurs between donor and acceptor molecule films $31_1$ and $33_1$ of first layer $21_1$ where light irradiates, and the ionization state at this portion is held. Upon occurrence of the ionization state, new charge transfer/absorption occurs. More specifically, the absorption peak at wavelength λ1 in FIG. 14A shifts to the absorption peak at wavelength λ1, in FIG. 14B. In this manner, information is written in a two-dimensional manner in first layer $21_1$ as a change in light absorption characteristics by using light having a wavelength λ1. Similarly, information is written in second layer $21_2$ as a change in light absorption characteristics by using light having wavelength λ2.

In the above information writing operation, a predetermined external electric field may be applied to the recording medium. This is effective since it promotes dissociation of electron-hole pairs formed by light excitation. The insulating molecule film in each recording layer serves to increase the writing efficiency and to hold the recording conditions.

FIG. 15 shows an example of a practical information writing system. Reference numeral 35 denotes an incandescent light source; 36, a scan control system of light source 35; 37, a mirror; 38, a filter; and 39, a focusing lens. A wavelength is selected by filter 38 and information writing is performed in a predetermined recording layer of the recording medium in the above manner by using light having a predetermined wavelength. In this manner, information can be written in a recording medium in a three-dimensional manner and in a multiplex manner by using a plurality of wavelengths.

FIG. 16 schematically shows a case wherein information is read from a recording medium in which information is written. Reference symbols a1, a2, . . . respectively denote information recording units of first recording layer $21_1$; b1, b2, . . . respectively denote information recording units of second recording layer $21_2$; and c1, c2, . . . respectively denote information recording units of third recording layer $21_3$. As shown in FIG. 16, when information is to be recorded in different recording layers, no space need be reserved between the information recording units. Thus, information recording of a higher density can be performed, compared to those of the conventional heat mode method.

Information is optically read using wavelengths λ1', λ2', . . . , and λn' in FIG. 14B as reading wavelengths. More specifically, when the light source for light having wavelength λ1' is scan-controlled and a light absorption strength distribution by the recording medium is measured, information in first layer $21_1$ can be read out. Similarly, when light having wavelength λ2' is scanned, information in second layer $21_2$ can be read out.

Figure 17:
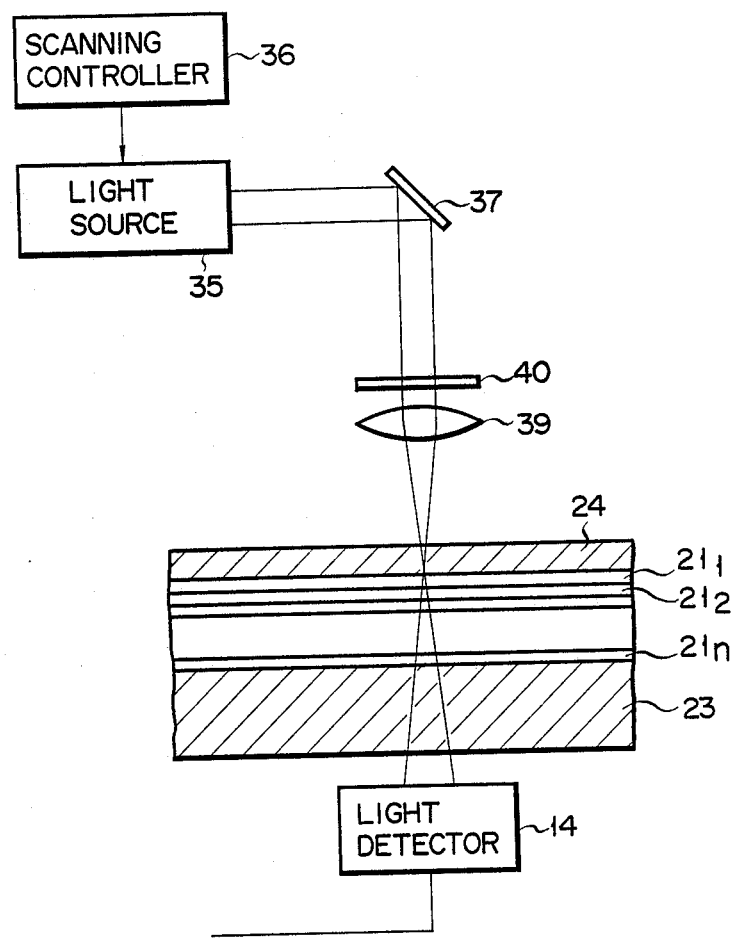
FIG. 17 is a view showing a recording system according to the third embodiment of the present invention.

FIG. 17 schematically shows an arrangement of a system for reading out information in this manner. The system of FIG. 17 is basically the same as that of FIG. 15. Reading wavelengths are sequentially selected by filter 40 in the order of λ1', λ2', . . . and λn' and absorption strength distributions in the recording medium with the respective wavelengths are measured. Multiplex information can be read out in this manner. In FIG. 17, light transmitted through the recording medium is detected by photodetector 14. However, when the substrate is designed as a reflecting substrate, light reflected by the substrate can be read out.

As described above, according to the present invention, a recording device, wherein information is recorded in a considerably high density by using light having a plurality of wavelengths, can be obtained. Furthermore, since the information recording principle of the present invention utilizes charge transfer between molecules by the photon mode, when writing is performed using an external electric field as well, high-sensitive, high-contrast information recording can be performed.

The present invention is not limited to the above embodiments. For example, in the arrangement of the recording medium shown in FIG. 13, either the donor or acceptor molecule films of first, second, . . . recording layers $21_1$, $21_2$, . . . can be the same. An appropriate acceptor or donor molecule film can be provided in place of an insulating molecule film between the donor and acceptor molecule films of each recording layer. More specifically, between a first organic thin film containing donor molecules and a second organic thin film containing acceptor molecules, a third organic thin film containing acceptor molecules having a smaller electron affinity than that of the second organic thin film, or a third organic thin film containing donor molecules having a larger electron affinity than that of the first organic thin film, can be provided. Furthermore, the combination of different donor and acceptor molecule films need not be stacked as different layers, but can be an appropriate mixture film.

What is claimed is:

1. An information writing method of an optical recording device, comprising the steps of:
    selectively irradiating light on an optical recording medium which comprises a thin organic film layer and a pair of electrodes for applying a voltage to said thin organic film layer, said thin organic film layer comprising a first thin organic film containing donor molecules and a second thin organic film containing acceptor molecules, said selectively irradiating step causing charge transfer between said donor molecules and said acceptor molecules;
    applying a voltage to said electrodes during said step of selectively irradiating; and
    recording as information a change in optical or electrical characteristics of said thin organic film caused upon charge transfer;
    repeatedly stacking layers, each comprising said first thin organic film containing donor molecules and said second thin organic film containing acceptor molecules, with an insulating molecule film sandwiched therebetween, prior to said irradiating step.

2. A method according to claim 1, comprising:
    forming said stacked layers in accordance with a Langmuir-Blodgett process.

3. A method according to claim 1, wherein a wavelength of the light is shorter than that corresponding to a minimum excitation singlet energy of said donor molecules.

4. A method according to claim 1, comprising:
forming said stacked layers on a light-transmitting substrate with a transparent electrode interposed between said stacked layers and said substrate.

5. A method according to claim 1, comprising:
providing an insulating organic molecule layer or a silicon dioxide layer between said stacked layers and said electrodes.

6. An optical recording device comprising:
a recording medium comprising a thin organic film layer, including a first thin organic film containing donor molecules and a second thin organic film containing acceptor molecules, for recording as information a change in optical characteristics, caused upon charge transfer between said donor and acceptor molecules, wherein at least one of said first and second thin organic films includes different donor and acceptor molecules, respectively; and
means for irradiating said thin organic film layer to perform information writing and erasing;
wherein said thin organic film layer comprises plural repeatedly stacked layers each comprising said first thin organic film containing donor molecules and said second thin organic film containing acceptor molecules, and an insulating molecule film sandwiched between said first and second thin organic films.

7. A device according to claim 6, wherein said thin organic film is formed in accordance with a Langmuir-Blodgett process.

8. A device according to claim 6, wherein said irradiating means comprises means for producing a wavelength of the light shorter than that corresponding to a minimum excitation singlet energy of said donor molecules.

9. A device according to claim 6, wherein said thin organic film layer is formed on a light-transmitting substrate with a transparent electrode interposed between said thin organic film layer and said substrate.

10. A device according to claim 6, comprising:
a pair of electrodes provided on the both sides of the thin organic film layer; and
an insulating organic molecule layer or a silicon dioxide layer provided between said thin organic film layer and said electrodes.

11. A device according to claim 6, wherein combinations of donor and acceptor molecules are different from one stack layer member to another.

12. An information writing method of an optical recording device, comprising the steps of:
forming an optical recording medium which comprises plural thin organic film layers and a pair of electrodes for applying a voltage to said thin organic film layers, each said thin organic film layer comprising a first thin organic film containing donor molecules, a second thin organic film containing acceptor molecules, and a third thin organic film, which contains different acceptor molecules relative to the acceptor molecules of the second thin organic film, provided between said first and second thin organic films, said plural thin organic film layers being repeatedly stacked to produce a super lattice structure with each thin organic film layer being a stack layer member of said super lattice structure;
selectively irradiating said optical recording medium having said super lattice structure to cause charge transfer between said donor molecules and said acceptor molecules;
applying a voltage to said electrodes during said step of selectively irradiating; and
recording as information a change in optical or electrical characteristics of said super lattice structure caused upon charge transfer.

13. A method according to claim 12, comprising:
forming said stack layer members of combinations of different donor and acceptor molecules from one stack layer member to another.

14. A method according to claim 12, comprising:
forming said third organic thin film with acceptor molecules having a smaller electron affinity than that of said acceptor molecules contained in said second thin organic film.

15. A method according to claim 12, comprising:
forming at least one of said first and second thin organic films of plural different donor and acceptor molecules, respectively.

16. An information writing method of an optical recording device, comprising the steps of:
forming an optical recording medium which comprises plural thin organic film layers and a pair of electrodes for applying a voltage to said thin organic film layers, each said thin organic film layer comprising a first thin organic film containing donor molecules, a second thin organic film containing acceptor molecules, and a third thin organic film, which contains different donor molecules relative to the donor molecules of the first thin organic film, provided between said first and second thin organic films, said plural thin organic film layers being repeatedly stacked to produce a super lattice structure with each thin organic film layer being a stack layer member of said super lattice structure;
selectively irradiating said optical structure to cause charge transfer between said donor molecules and said acceptor molecules;
applying a voltage to said electrodes during said step of selectively irradiating; and
recording as information a change in optical or electrical characteristics of said super lattice structure caused upon charge transfer.

17. A method according to claim 16, comprising:
forming said stack layer members of combinations of different donor and acceptor molecules from one stack layer member to another.

18. A method according to claim 16, comprising:
forming said third thin organic film with donor molecules having a larger ionization potential than that of said donor molecules contained in said first thin organic film.

19. An optical recording device comprising:
a recording medium comprising a thin organic film layer, including a first thin organic film containing donor molecules and a second thin organic film containing acceptor molecules, for recording as information a change in optical characteristics, caused upon charge transfer between said donor and acceptor molecules, wherein at least one of said first and second thin organic films includes different donor and acceptor molecules, respectively; and means for irradiating said thin organic film layer to perform information writing and erasing;

wherein said thin organic film layer has a super lattice structure obtained by repeatedly stacked stack layer members, each comprising said first thin organic film containing donor molecules, said second thin organic film containing acceptor molecules, and a third thin organic film therebetween that contains different acceptor molecules relative to that of said acceptor molecules of said second thin organic film.

20. A device according to claim 19, wherein said acceptor molecules contained in said third thin organic film have a smaller electron affinity than that of said acceptor molecules contained in said second thin organic film.

21. An optical recording device comprising:

a recording medium comprising a thin organic film layer, including a first thin organic film containing donor molecules and a second thin organic film containing acceptor molecules, for recording as information a change in optical characteristics, caused upon charge transfer between said donor and acceptor molecules, wherein at least one of said first and second thin organic films includes different donor and acceptor molecules, respectively; and means for irradiating said thin organic film layer to perform information writing and erasing;

wherein said thin organic film layer has a super lattice structure obtained by repeatedly stacking stack layer members, each comprising said first thin organic film containing donor molecules, said second thin organic film containing acceptor molecules, and a third thin organic film therebetween that contains different donor molecules relative to said donor molecules of said first thin organic film.

22. A device according to claim 21, wherein said donor molecules contained in said third thin organic film have a larger ionization potential than that of said donor molecules contained in said first thin organic film.

23. An optical recording device comprising:

a thin organic film layer comprising a first thin organic film containing donor molecules and a second thin organic film containing acceptor molecules as a recording medium, for recording as information a change in optical characteristics caused by charge transfer between said donor and acceptor molecules, wherein at least one of said first and second thin organic films contains different donor and acceptor molecules, respectively; and means for irradiating lights of not less than two different wavelengths on said thin organic film layer to cause charge transfer between donor and acceptor molecules in different corresponding regions, thus recording information in a multiplex manner;

wherein said thin organic film layer comprises a plurality of stacked stack layer members each comprising said first thin organic film containing donor molecules, said second thin organic film containing acceptor molecules, and an insulating molecule film, wherein combination of donor and acceptor molecules are different from one stack layer member to another.

24. A device according to claim 23, wherein said thin organic film layer is formed on a light-transmitting substrate with a transparent electrode interposed between said thin organic film layer and said substrate.

25. A device according to claim 23, comprising:

a pair of electrodes provided on the both sides of the thin organic film layer; and an insulating organic molecule layer or a silicon dioxide layer provided between said thin organic film layer and said electrodes.

26. A device according to claim 23, wherein said acceptor molecules contained in said third thin organic film have a smaller electron affinity than that of said acceptor molecules contained in said second thin organic film.

27. A device according to claim 23, wherein said donor molecules contained in said third thin organic film have a larger ionization potential than that of said donor molecules contained in said first thin organic film.

28. A device according to claim 23, wherein said thin organic film layer is formed in accordance with a Langmuir-Blodgett process.

29. A device according to claim 23, wherein said wavelengths of the light are shorter than that corresponding to a minimum excitation singlet energy of said donor molecules.

30. An optical recording device comprising:

a thin organic film layer comprising a first thin organic film containing donor molecules and a second thin organic film containing acceptor molecules as a recording medium, for recording as information a change in optical characteristics caused by charge transfer between said donor and acceptor molecules, wherein at least one of said first and second thin organic films contains different donor and acceptor molecules, respectively; and means for irradiating lights of not less than two different wavelengths on said thin organic film layer to cause charge transfer between donor and acceptor molecules in different corresponding regions, thus recording information in a multiplex manner;

wherein said thin organic film layer has a super lattice structure obtained by repeatedly stacked stack layer members, each comprising said first thin organic film containing donor molecules, said second thin organic film containing acceptor molecules, and a third thin film therebetween that contains different acceptor molecules relative to said acceptor molecules of said second thin organic film, wherein combinations of donor and acceptor molecules are different from one stack layer member to another.

31. An optical recording device comprising:

a thin organic film layer comprising a first thin organic film containing donor molecules and a second thin organic film containing acceptor molecules as a recording medium, for recording as information a change in optical characteristics caused by charge transfer between said donor and acceptor molecules, wherein at least one of said first and second thin organic films contains different donor and acceptor molecules, respectively; and means for irradiating lights of not less than two different wavelengths on said thin organic film layer to cause charge transfer between donor and acceptor molecules in different corresponding regions, thus recording information in a multiplex manner;

wherein said thin organic film layer has a super lattice structure obtained by repeatedly stacked stack layer members, each comprising said first thin organic film containing donor molecules, said second thin organic film containing acceptor molecules, and a third thin organic film therebetween that contains different donor molecules relative to that of said donor molecules of said first thin film, wherein combinations of donor and acceptor molecules are different from one stack layer member to another.

* * * * *